(12) United States Patent
Chatterjee et al.

(10) Patent No.: US 10,726,096 B2
(45) Date of Patent: Jul. 28, 2020

(54) SPARSE MATRIX VECTOR MULTIPLICATION WITH A MATRIX VECTOR MULTIPLICATION UNIT

(71) Applicant: Hewlett Packard Enterprise Development LP, Houston, TX (US)

(72) Inventors: Soumitra Chatterjee, Bangalore (IN); Chinmay Ghosh, Bangalore (IN); Mashood Abdulla Kodavanji, Bangalore (IN); Mohan Parthasarathy, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 118 days.

(21) Appl. No.: 16/159,578

(22) Filed: Oct. 12, 2018

(65) Prior Publication Data
US 2020/0117700 A1    Apr. 16, 2020

(51) Int. Cl.
*G06F 17/16* (2006.01)
*G06N 3/04* (2006.01)
*G06N 3/08* (2006.01)

(52) U.S. Cl.
CPC .............. *G06F 17/16* (2013.01); *G06N 3/04* (2013.01); *G06N 3/08* (2013.01)

(58) Field of Classification Search
CPC ...................................................... G06F 17/16
See application file for complete search history.

(56) References Cited

U.S. PATENT DOCUMENTS

| | | | |
|---|---|---|---|
| 9,418,048 B2* | 8/2016 | Usui | G06F 17/16 |
| 9,697,176 B2 | 7/2017 | Daga | |
| 9,910,827 B2* | 3/2018 | Muralimanohar | G06F 17/16 |
| 2018/0173677 A1* | 6/2018 | Muralimanohar | G06F 7/5443 |
| 2018/0189239 A1* | 7/2018 | Nurvitadhi | G06F 9/3001 |
| 2019/0026251 A1* | 1/2019 | Bekas | G06F 7/523 |

(Continued)

FOREIGN PATENT DOCUMENTS

KR    101400577    6/2014

OTHER PUBLICATIONS

L. Yavits, R. Ginosar, "Sparse Matrix Multiplication on CAM Based Accelerator", CoRR, arXiv:1705.09937, 2017 (Year: 2017).*

(Continued)

*Primary Examiner* — Matthew D Sandifer
(74) *Attorney, Agent, or Firm* — Sheppard Mullin Richter & Hampton LLP

(57) ABSTRACT

Systems and methods are provided for sparse matrix vector multiplication with a matrix vector multiplication unit. The method includes partitioning a sparse matrix of entries into a plurality of sub-matrices; mapping each of the sub-matrices to one of a plurality of respective matrix vector multiplication engines; partitioning an input vector into a plurality of sub-vectors; computing, via each matrix vector multiplication engine, a plurality of intermediate result vectors each resulting from a multiplication of one of the sub-matrices and one of the sub-vectors; for each set of rows of the sparse matrix, adding elementwise the intermediate result vectors to produce a plurality of result sub-vectors; and concatenating the result sub-vectors to form a result vector.

17 Claims, 7 Drawing Sheets

(56) References Cited

U.S. PATENT DOCUMENTS

2019/0361954 A1* 11/2019 Page .................... G06F 3/0673

OTHER PUBLICATIONS

Enver Kayaaslan, Bora Uçar, Cevdet Aykanat. Semi-two-dimensional partitioning for parallel sparse matrix-vector multiplication. PCO2015 (IPDPSW), May 2015, Hyderabad, India. pp. 1125-1134. ffhal-01159692 (Year: 2015).*

Y. Liu and B. Schmidt, "LightSpMV: Faster CSR-based sparse matrix-vector multiplication on CUDA-enabled GPUs," 2015 IEEE 26th International Conference on Application-specific Systems, Architectures and Processors (ASAP), Toronto, ON, 2015, pp. 82-89 (Year: 2015).*

A. N. Yzelman and R. H. Bisseling. Cache-oblivious sparse matrix-vector multiplication by using sparse matrix partitioning methods. SIAM Journal on Scientific Computing, 31(4):3128--3154, 2009 (Year: 2009).*

Rakshith Kunchum. On improving sparse matrix-matrix multiplication on gpus. Master's Thesis, the Ohio State University, 2017 (Year: 2017).*

Bell et al., "Implementing Sparse Matrix-Vector Multiplication on Throughput-Oriented Processors", Proceedings of the Conference on High Performance Computing Networking, Storage and Analysis, 2009, 11 pages.

Gray et al., "GPU Kernels for Block-Sparse Weights", Retrieved on Sep. 24, 2019, 12 pages.

Hu et al., "Dot-Product Engine for Neuromorphic Computing: Programming 1T1M Crossbar to Accelerate Matrix-Vector Multiplication", Proceedings of the 53rd Annual Design Automation Conference, 2016, 7 pages.

John Paul Strachan, "The Dot-Product Engine (DPE): exploring high efficiency analog multiplication with memristor arrays", Hewlett Packard Labs, Dec. 11, 2015, 29 pages.

Liu et al., "Sparse Convolutional Neural Networks", IEEE Conference on Computer Vision and Pattern Recognition (CVPR), 2015, 9 pages.

Nathan Bell, "Sparse matrix representations and iterative solvers", NVIDIA, Retrived on Sep. 24, 2019, 25 pages.

Pironkov et al., "Investigating Sparse Deep Neural Networks for Speech Recognition", IEEE Workshop on Automatic Speech Recognition and Understanding, 2015, 6 pages.

Wang et al., "A sparse matrix approach to neural network training", Proceedings of ICNN'95—International Conference on Neural Networks, 1995.

* cited by examiner $$\begin{pmatrix} a_{11} & a_{12} & .. & .. & .. & a_{1n} \\ a_{21} & a_{22} & .. & .. & .. & a_{2n} \\ .. & .. & .. & .. & .. & .. \\ .. & .. & .. & .. & .. & .. \\ .. & .. & .. & .. & .. & .. \\ a_{m1} & a_{m2} & .. & .. & .. & a_{mn} \end{pmatrix} \rightarrow \begin{pmatrix} B_{11} & B_{12} & .. & B_{1q} \\ B_{21} & B_{22} & .. & B_{2q} \\ .. & .. & .. & .. \\ B_{p1} & B_{p2} & .. & B_{pq} \end{pmatrix}$$

FIG. 3

$$\begin{pmatrix} \begin{pmatrix} 0 & 0 & 0 & 0 \\ 0 & 0 & 0 & 0 \\ 0 & 0 & 0 & 0 \\ 0 & 0 & 0 & 0 \end{pmatrix} \begin{pmatrix} 0 & 1 & 0 & 0 \\ 0 & 0 & 0 & 0 \\ 0 & 0 & 0 & 0 \\ 0 & 0 & 1 & 0 \end{pmatrix} \begin{pmatrix} 0 & 0 & 0 & 0 \\ 0 & 0 & 0 & 0 \\ 0 & 1 & 0 & 0 \\ 0 & 0 & 0 & 0 \end{pmatrix} \\ \begin{pmatrix} 0 & 0 & 0 & 0 \\ 0 & 0 & 1 & 0 \\ 0 & 0 & 0 & 0 \\ 0 & 0 & 0 & 0 \end{pmatrix} \begin{pmatrix} 0 & 1 & 1 & 0 \\ 0 & 1 & 0 & 1 \\ 0 & 0 & 0 & 1 \\ 0 & 0 & 0 & 0 \end{pmatrix} \begin{pmatrix} 0 & 0 & 0 & 0 \\ 0 & 0 & 1 & 0 \\ 0 & 0 & 0 & 0 \\ 0 & 0 & 0 & 0 \end{pmatrix} \\ \begin{pmatrix} 0 & 0 & 0 & 0 \\ 0 & 0 & 0 & 0 \\ 0 & 0 & 0 & 0 \\ 0 & 0 & 0 & 0 \end{pmatrix} \begin{pmatrix} 0 & 0 & 0 & 0 \\ 0 & 1 & 0 & 0 \\ 0 & 0 & 0 & 1 \\ 0 & 0 & 0 & 0 \end{pmatrix} \begin{pmatrix} 0 & 0 & 0 & 0 \\ 0 & 0 & 0 & 0 \\ 0 & 0 & 0 & 0 \\ 0 & 0 & 0 & 0 \end{pmatrix} \end{pmatrix}$$

FIG. 4

$$\begin{pmatrix} B_{11} & B_{12} & .. & B_{1q} \\ B_{21} & B_{22} & .. & B_{2q} \\ .. & .. & .. & .. \\ B_{p1} & B_{p2} & .. & B_{pq} \end{pmatrix} \times \begin{pmatrix} Y_1 \\ Y_2 \\ . \\ Y_q \end{pmatrix} = \begin{matrix} [V_{11}] & [V_{12}] & .. & [V_{1q}] \\ [V_{21}] & [V_{21}] & .. & [V_{2q}] \\ .. & .. & .. & .. \\ [V_{p1}] & [V_{p2}] & .. & [V_{pq}] \end{matrix}$$

$J_0\ J_1\ J_2\ J_3\ J_4$

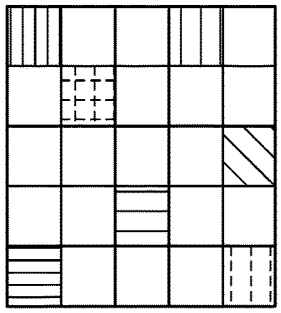

$J_i$ = Columns of Width MVMU_WIDTH $J_0 = 0$, $J_{i+1} - J_i$ = MVMU_WIDTH

Colored Cells Are the Submatrices Width at Least One Nonzero Element

| Index Pointer | 0 | 2 | 3 | 4 | 5 | 7 |

| Crossbar Pointer | $XBAR_1$ | $XBAR_2$ | $XBAR_3$ | $XBAR_4$ | $XBAR_5$ | $XBAR_6$ | $XBAR_7$ |

| Column Pointer | $J_0$ | $J_3$ | $J_1$ | $J_4$ | $J_2$ | $J_6$ | $J_4$ |

FIG. 8

Percent of Nonzero Submatrix, Dimension = 262144 X 262144

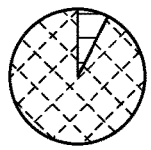

☐ Non Zero Submatrix %
☐ Zero Submatrix %

Percent of Nonzero Submatrix, Dimension = 32768 X 32768

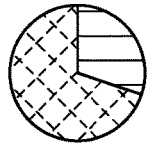

☐ Non Zero Submatrix %
☐ Zero Submatrix %

FIG. 9

SPARSE MATRIX VECTOR MULTIPLICATION WITH A MATRIX VECTOR MULTIPLICATION UNIT

DESCRIPTION OF RELATED ART

Sparse matrix structures (that is, matrices having few non-zero entries arise in numerous computational disciplines including convolutional neural networks, and as a result, methods for efficiently using them are often critical to the performance of many applications. Sparse matrix-vector multiplication operations have proven to be of critical importance in computational science. They represent the dominant cost in many iterative methods for solving large-scale linear systems, eigenvalue problems and convolutional neural networks that arise in a wide variety of scientific, engineering and deep machine learning applications. Several studies have highlighted the importance of sparse matrix structures in the context of neural networks. Some common examples of sparse matrix structures in the real world include link matrices that show the links from one website to another, and term occurrence matrices for comparison of words in an article against all known words.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 shows how a sparse matrix may be partitioned into sub-matrices according to one embodiment.

FIG. 4 shows how a sparse matrix A having dimensions 12×12 may be partitioned into nine sub-matrices B each having dimensions 4×4 according to one embodiment.

FIG. 8 illustrates the index pointer, crossbar pointer, and column pointer sequences according to one embodiment.

FIG. 9 shows test results that demonstrate the advantages of the disclosed technology.

The figures are not exhaustive and do not limit the present disclosure to the precise form disclosed.

DETAILED DESCRIPTION

Neural networks models and frameworks are evolving fast, enabling execution (training, testing, and inference) on different hardware. Multiple dedicated hardware platforms specialized for running neural network models are emerging to support the needs of neural networks and the specifics of the development and deployment. One such platform is the Hewlett Packard Enterprise (HPE) Dot-Product Engine (DPE), which is described in the document "Hewlett Packard Dot-Product Engine for Neuromorphic Computing: Programming 1T1M Crossbar to Accelerate Matrix-Vector Multiplication" by Hu, et al., Hewlett Packard Labs, 2016. The HPE DPE is an innovative, high-density, high power efficiency accelerator from HPE utilizing the natural current accumulation feature of a memristor crossbar. The HPE DPE, together with a fast conversion algorithm, is a realistic solution to accelerate matrix-vector multiplication in robust applications with tolerance for lower computing accuracy such as neural network algorithms. This technique of computing matrix-vector multiplication in the analog domain can be orders of magnitude more efficient than any digital ASIC, particularly as the crossbar array size may be scaled as large as is feasible. But while various embodiments are described with reference to neural networks, it should be appreciated that the disclosed technology has application beyond neural networks. The disclosed technology has many scientific applications, for example in economic modeling and information retrieval, where it can solve linear equations like y=Ax, where A is a sparse matrix and x is an input vector.

Sparse matrix vector multiplication has always been a favorite research topic for decades and several techniques and algorithms have been proposed (e.g. CSR, COO, ELL-PACK, ELLPACK-R, 2D, etc.) to help optimize sparse matrix vector multiplication for both time and space. As a hardware accelerator, the HPE DPE performs matrix-vector multiplication by leveraging electrical properties such as Kirchoff's Current Law (KCL) and Ohm's Law over a memristor crossbar. However, since the crossbar uses conductance to store individual matrix values, the DPE lacks the ability to store and/or interpret commonly used efficient representations such as CSR, COO, ELLPACK, ELLPACK-R, etc., and instead operates directly on matrix structures.

Figure 1:
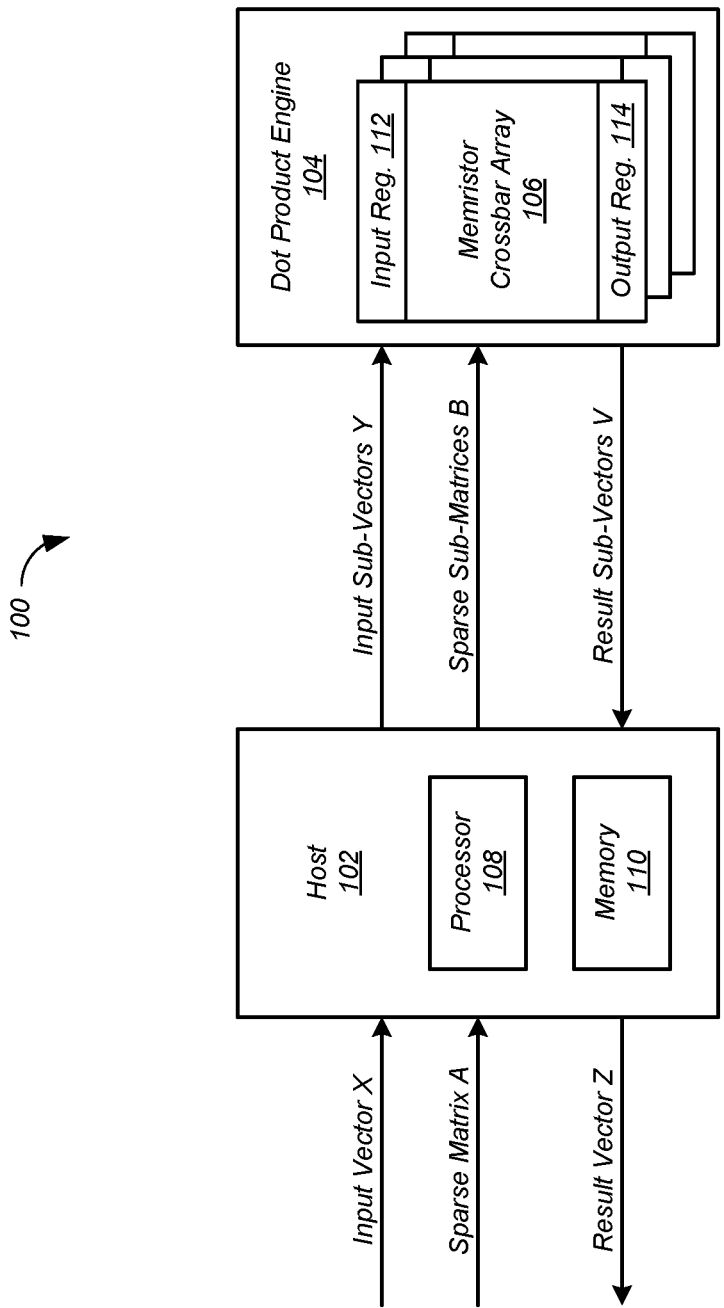
FIG. 1 is a block diagram of a sparse matrix vector multiplication system according to one embodiment.

FIG. 1 is a block diagram of a sparse matrix vector multiplication system 100 according to one embodiment. The system 100 includes a host 102 and a dot product engine 104. The host 102 includes a processor 108 and a memory 110. The dot product engine 104 includes a plurality of memristor crossbar arrays 106. Each of the memristor crossbar arrays 106 includes an input register 112 and an output register 114. While various embodiments are described in terms of the dot product engine 104, it should be understood that other hardware accelerators having matrix vector multiplication units may be used instead of the dot product engine 104.

As described in detail below, the system 102 receives a sparse matrix A and an input vector X, and multiplies the two to generate a result vector Z. In particular, the host 102 employs a software approach to partition the sparse matrix A into sparse sub-matrices B, and then maps the sub-matrices B to respective memristor crossbar arrays 106 in the dot product engine 104. Sub-matrices B having no non-zero entries have no effect on the computation, and so are discarded, that is, not mapped to any memristor crossbar array 106.

The host 102 also partitions the input vector X into sub-vectors Y and applies the sub-vectors Y as inputs to the memristor crossbar arrays 106. The dot product engine 104 multiplies the sub-matrices B by the sub-vectors Y to produce result sub-vectors V. The host 102 then adds the sub-vectors V elementwise and concatenates the sum vectors to form the result vector Z. Advantages that may be gained by discarding sub-matrices having no non-zero entries include faster computations, lower power usage, and reduced volumes of data transferred to the dot product engine 104.

The entries of the sparse matrix A may represent weights in a neural network, and the input vector X may represent input data for the neural network. For example, a weight may be associated with an edge in a graph. If the graph is not fully connected, it can be represented as a sparse matrix where the weights constitute the non-zero elements of the matrix. The entries of the result vector Z may represent output of a run of a neural network. The technology disclosed herein may be applicable to both inference runs and training runs for neural networks.

Figure 2:
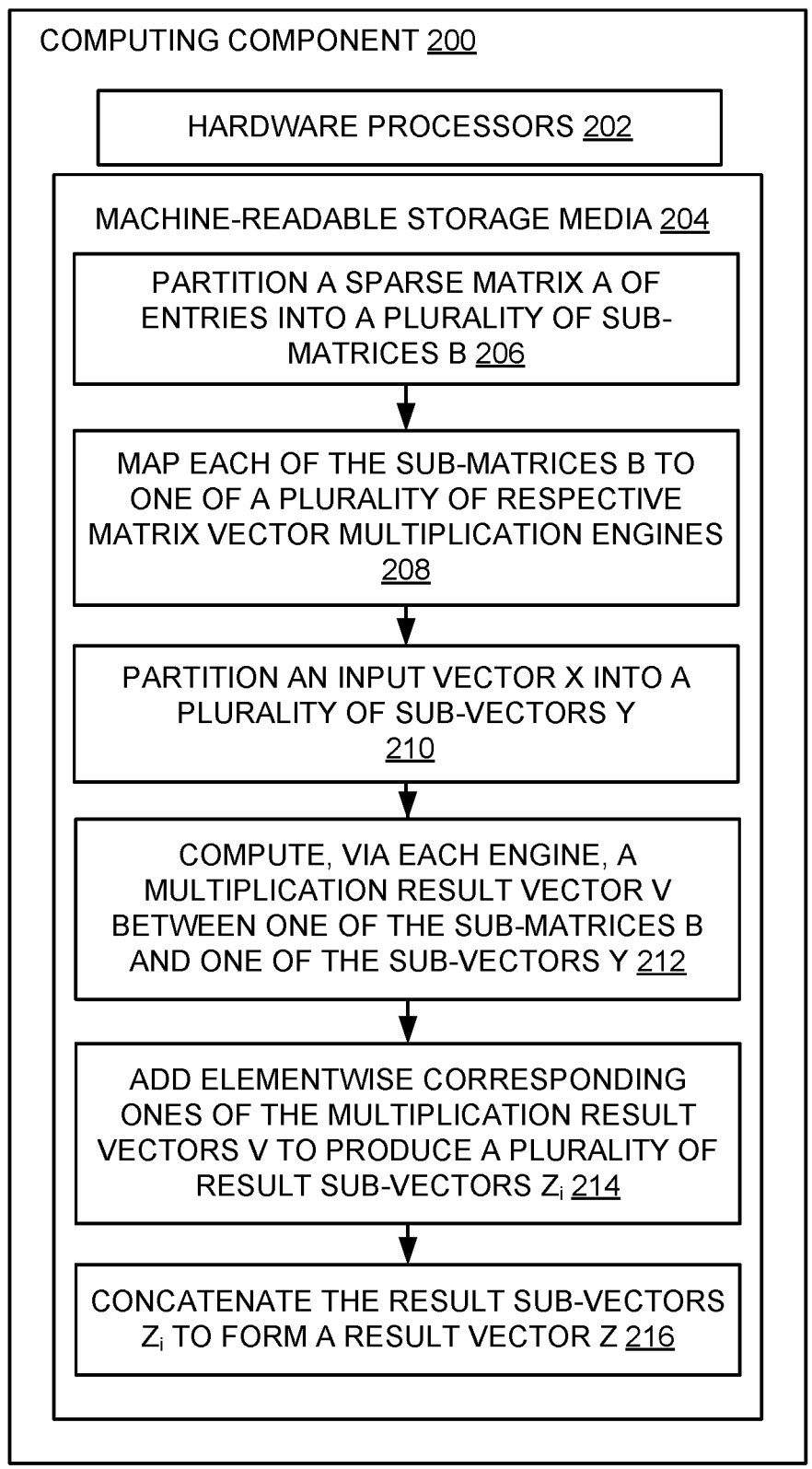
FIG. 2 is a block diagram of an example computing component or device for sparse matrix multiplication in accordance with one embodiment.

FIG. 2 is a block diagram of an example computing component or device 200 for sparse matrix multiplication in accordance with one embodiment. Computing component 200 may be, for example, a server computer, a controller, or any other similar computing component capable of processing data. In the example implementation of FIG. 2, the computing component 200 includes a hardware processor, 202, and machine-readable storage medium, 204. In some embodiments, computing component 200 may be an embodiment of the host 102 FIG. 1, the dot product engine 104 of FIG. 1, or some combination thereof.

Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-216, to control processes or operations for sparse matrix multiplication. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 202 may be a non-transitory storage medium, where the term "non-transitory" does not encompass transitory propagating signals. As described in detail below, machine-readable storage medium 202 may be encoded with executable instructions, for example, instructions 206-216.

Hardware processor 202 may execute instruction 206 to partition a sparse matrix A of entries into a plurality of sub-matrices B. In the system 100 of FIG. 1, this operation may be implemented in software by the host 102. For example, referring to FIG. 3, a sparse matrix A having dimensions m×n may be partitioned into p×q sub-matrices B, each having dimensions MVMU_WIDTH×MVMU_WIDTH, where MVMU_WIDTH is the width of the crossbar array 106. In some embodiments, the dimensions of the sub-matrices B are chosen to match the dimensions of the memristor crossbar arrays 106 of the dot product engine 104. For example, if the dimensions of each memristor crossbar array 106 are m×m, then the sparse matrix A is partitioned into sub-matrices B, each having dimensions m×m. However, it should be understood that this is not necessary, and that the sub-matrices B in some embodiments need not be square. Another example is provided in FIG. 4, where a sparse matrix A having dimensions 12×12 is partitioned into nine sub-matrices B, each having dimensions 4×4.

Hardware processor 202 may execute instruction 208 to map each of the sub-matrices B to one of a plurality of respective matrix vector multiplication engines. In the system of FIG. 1, each of the sub-matrices B is mapped to a respective one of the memristor crossbar arrays 106, with each entry of each of the sub-matrices B represented in the memristor crossbar array 106 by a respective conductance value. In some embodiments, sub-matrices B having no non-zero entries are discarded, that is, not mapped to a memristor crossbar array 106, because they have no effect on the result.

It should be noted that partitioning the sparse matrix A, identifying the sub-matrices B having non-zero entries, and placing them onto the memristor crossbar arrays 106 may be one-time activities, done as part of the device load or initialization. Because weight matrices do not change often once trained, these seemingly costly operations may have a minimal impact on the performance of neural network inference runs.

Figures 5, 6:
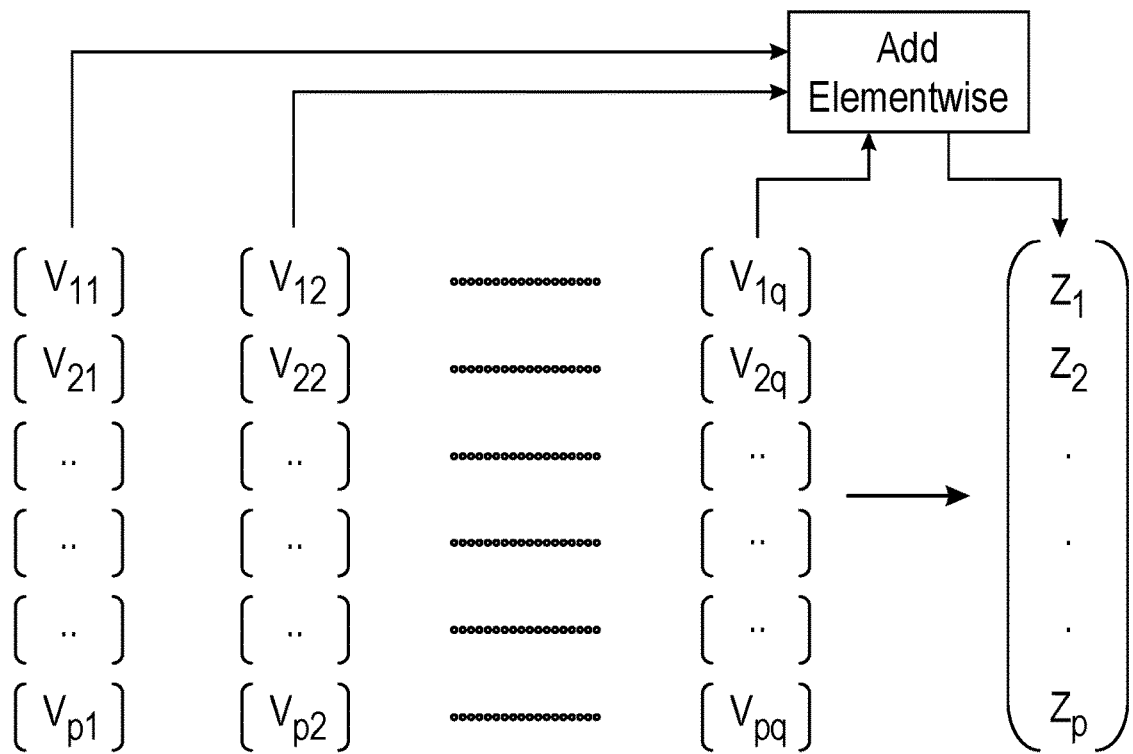
FIG. 5 shows an example multiplication of sub-vectors Y with the sub-matrices B of FIG. 3
FIG. 6 illustrates an operation, where the intermediate vectors V, resulting from multiplication of sub-matrices belonging to same set of rows with respective sub-vectors, are summed up elementwise to form the result sub-vectors $Z_i$.

Hardware processor 202 may execute instruction 210 to partition an input vector X into a plurality of sub-vectors Y. In the system 100 of FIG. 1, this operation may be implemented in software by the host 102. FIG. 5 shows an example multiplication of sub-vectors Y with the sub-matrices B of FIG. 3. In FIG. 5, each of the p×q sub-matrices B has dimensions MVMU_WIDTH×MVMU_WIDTH, and each of the sub-vectors Y has dimensions MVMU_WIDTH×1. In some embodiments, the dimensions of the sub-matrices B and the sub-vectors Y are chosen to match the dimensions of the memristor crossbar arrays 106 of the dot product engine 104. For example, if the dimensions of each memristor crossbar array 106 are m×m, then the sparse matrix A is partitioned into sub-matrices B, each having dimensions m×m, and the input vector X is partitioned into sub-vectors Y each having dimensions m×1. However, it should be understood that this is not necessary, and that the sub-matrices B need not be square.

Each sub-matrix $B_{ij}$ is multiplied with a sub-vector $Y_j$ to form the intermediate result vectors $V_{ij}$. Hardware processor 202 may execute instruction 212 to compute, via each engine 104, an intermediate result vector V between one of the sub-matrices B and one of the sub-vectors Y. In the system 100 of FIG. 1, the host 102 allocates the sub-vectors Y on the input registers 112 of the memristor crossbar arrays 106. The sub-vectors Y might be replicated across several cross bars. The multiplications between the sub-matrices B and the sub-vectors Y are carried out in the memristor crossbar arrays 106. Each result vector V is the result of the multiplication of a sub-matrix B with the corresponding sub-vector Y. The result vectors V are placed into the output registers 114 of the memristor crossbar arrays 106. The host 102 receives the intermediate result vectors V from the dot product engine 104.

Hardware processor 202 may execute instruction 214 to add elementwise corresponding ones of the intermediate result vectors V to produce a plurality of result sub-vectors Z. In the system 100 of FIG. 1, this operation may be implemented in software by the host 102. Continuing with the example of FIG. 5, for p×q sub-matrices B, each having dimensions MVMU_WIDTH×MVMU_WIDTH and sub-vectors Y each having dimensions MVMU_WIDTH×1, the total number of vectors V will be p×q. The vectors V corresponding to each subset of rows are summed up elementwise to form result sub-vectors $Z_i$. FIG. 6 illustrates an example of this operation, where the intermediate vectors V, resulting from multiplication of sub-matrices belonging to same set of rows with respective sub-vectors, are summed up elementwise to form the result sub-vectors $Z_i$. The result sub-vectors $Z_i$ are then concatenated to form the result vector Z.

Figure 7:
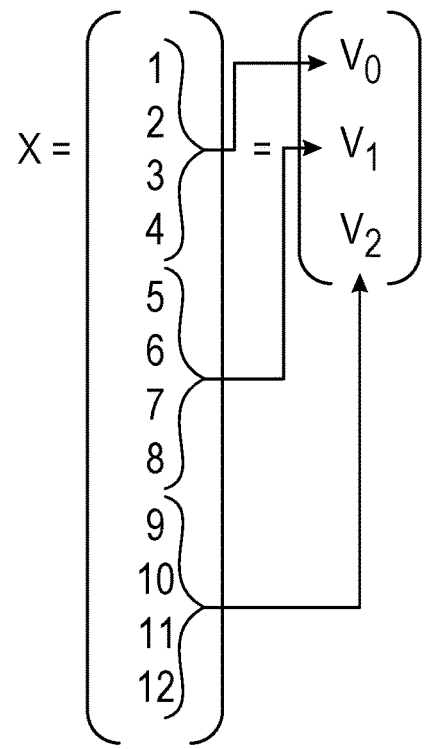
FIG. 7 illustrates the multiplication of the sparse matrix A of FIG. 4 by a dense input vector X.

FIG. 7 illustrates an example of the multiplication of the sparse matrix A of FIG. 4 by a dense input vector X. Referring to FIG. 7, the input vector X is partitioned into three sub-vectors $V_0$, $V_1$ and $V_2$, each of size 4×1. Multiplication of each sub-matrix $B_{ij}$ by the specific partitioned vector $V_j$ results in vector of size equal to the number of rows in the sub-matrix B. The vectors corresponding to the same set of rows of the input matrix (i.e. $B_{00}$, $B_{01}$ and $B_{02}$) are added up elementwise to arrive at the result vector Z.

For optimal performance, only sub-matrices with at least one non-zero element are identified and allocated on the crossbars 106. All sub-matrices B containing only zero elements are ignored, since the corresponding result sub-vector $Z_i$ will consist only of zeros. For clarity, the term nonzero-submatrix is used to denote a sub-matrix B with at least one non-zero element.

To achieve this optimization, three pointer sequences are used: index pointer, crossbar pointer, and column pointer. These pointer sequences are described with reference to FIG. 8. The crossbar pointer sequence identifies the crossbar 106 for each of the nonzero-submatrices. In other words, each nonzero-submatrix is allocated on an available crossbar 106, and the ID of the crossbar 106 is recorded in the crossbar pointer (e.g., $XBAR_1$, $XBAR_2$, and so on). The index pointer sequence tracks the starting position of the first nonzero-submatrix in the crossbar pointer sequence for every set of rows (MVMU_WIDTH). The column pointer sequence stores the starting column (with respect to the original sparse matrix A) for each nonzero-submatrix. For the actual matrix-vector multiplication computation, this column pointer is used as the index into the input vector X. Elements of size MVMU_WIDTH (the width of the crossbar 106) from the input vector X starting at this index will constitute the input sub-vector multiplicand Y for the corresponding nonzero-submatrix B. For example, the representation for the partitions of the matrix shown in FIG. 4 are given in Table 1.

TABLE 1

| Index Pointer | 0 | | 2 | | 5 | 6 |
|---|---|---|---|---|---|---|
| Crossbar Pointer | $XBAR_1$ | $XBAR_2$ | $XBAR_3$ | $XBAR_4$ | $XBAR_5$ | $XBAR_6$ |
| Column Pointer | 4 | 8 | 0 | 4 | 8 | 4 |

The above multiplication of each partition produces a result vector V of size MVMU_WIDTH×1. As shown in FIG. 6, the result vector obtained from $XBAR_1$ and $XBAR_2$ are added element-wise and constitute the first MVMU_WIDTH rows in the final output vector Z. Similarly, element-wise summation of result vectors from $XBAR_3$, $XBAR_4$, and $XBAR_5$ constitute the next MVMU_WIDTH rows of elements in the final output vector Z. This process continues until the end of the index pointer sequence in FIG. 8 is reached. The null element in crossbar pointer will indicate the end of the submatrices.

To demonstrate the advantages of the disclosed technology, it has been tested with Graph500 generated graphs using the RMAT parameters (0.45, 0.15, 0.15, 0.25). Two matrices of dimension 32768×32768 and 262144×262144 were tested. The percentage of submatrices having at least one non-zero are represented against the matrices with all zero elements is shown in FIG. 9, which shows that a significant portion of the matrices, being zero-valued elements, can be eliminated from the multiplication operation. Because the sub-matrices B having no non-zero elements are not used, they are not sent to the dot product engine 104, resulting in reduced data transfer, faster computations at the dot product engine 104, and reduced power consumption by the dot product engine 104.

Figure 10:
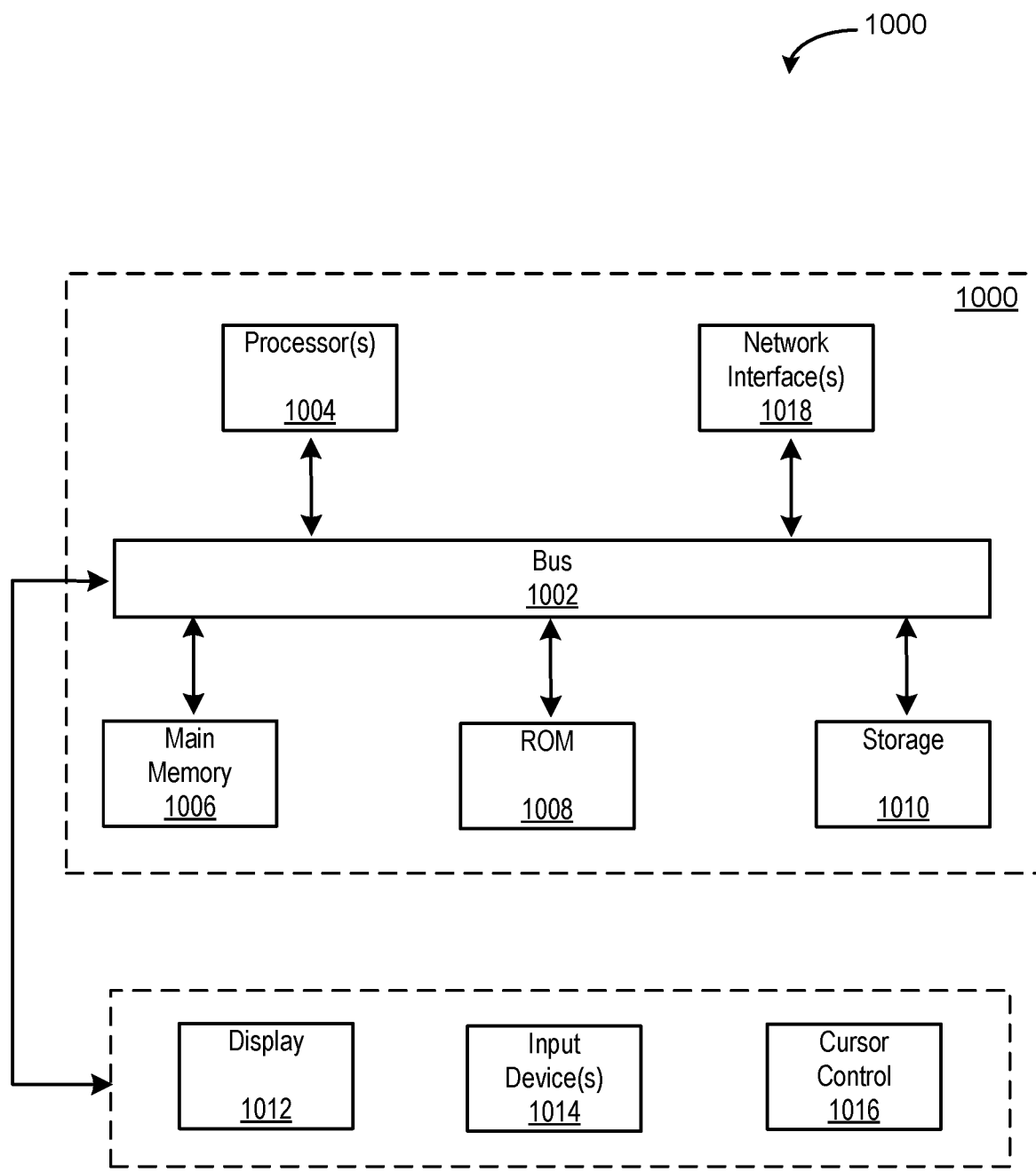
FIG. 10 depicts a block diagram of an example computer system in which various of the embodiments described herein may be implemented.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALS, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component, the machine-readable storage medium comprising instructions to cause the hardware processor to:
partition a sparse matrix of entries into a plurality of sub-matrices, each comprising a plurality of rows corresponding to a set of rows of the sparse matrix;
map each of the sub-matrices to one of a plurality of respective matrix vector multiplication engines;
partition an input vector into a plurality of sub-vectors, each comprising a plurality of vector elements;
input the sub-vectors to the matrix vector multiplication engines, wherein each of the matrix vector multiplication engines computes an intermediate result vector resulting from a multiplication of one of the sub-matrices and one of the sub-vectors, the intermediate result vector corresponding to the sub-matrix's set of rows of the sparse matrix;
for each set of rows of the sparse matrix, add elementwise the corresponding intermediate result vectors to produce a plurality of result sub-vectors; and
concatenate the result sub-vectors to form a result vector, wherein each of the matrix vector multiplication engines comprises a respective memristor array.

2. The medium of claim 1, wherein: each of the sub-matrices has a dimension of M×M; each of the sub-vectors has a dimension of M×1; and each of the matrix vector multiplication engines has a dimension of M×M.

3. The medium of claim 1, wherein the medium further comprises instructions executable by the hardware processor to: map only the sub-matrices having non-zero entries to the matrix vector multiplication engines.

4. The medium of claim 1, wherein the input vector is a dense vector.

5. The medium of claim 1, wherein: the entries of the sparse matrix represent weights in a neural network; and entries of the input vector represent input data for the neural network.

6. The medium of claim 1, wherein: entries of the result vector represent output of a run of a neural network, wherein the run is at least one of (i) a training run, and (ii) an inference run.

7. A system, comprising:
a plurality of respective matrix vector multiplication engines;
a hardware processor; and
a non-transitory machine-readable storage medium encoded with instructions executable by the hardware processor to:
partition a sparse matrix of entries into a plurality of sub-matrices, each comprising a plurality of rows corresponding to a set of rows of the sparse matrix;
map each of the sub-matrices to one of a plurality of respective matrix vector multiplication engines;
partition an input vector into a plurality of sub-vectors, each comprising a plurality of vector elements;
input the sub-vectors to the matrix vector multiplication engines, wherein each of the matrix vector multiplication engines computes an intermediate result vector resulting from a multiplication of one of the sub-matrices and one of the sub-vectors, the intermediate result vector corresponding to the sub-matrix's set of rows of the sparse matrix;
for each set of rows of the sparse matrix, add elementwise the corresponding intermediate result vectors to produce a plurality of result sub-vectors; and
concatenate the result sub-vectors to form a result vector, wherein each of the matrix vector multiplication engines comprises a respective memristor array.

8. The system of claim 7, wherein: each of the sub-matrices has a dimension of M×M; each of the sub-vectors has a dimension of M×1; and each of the matrix vector multiplication engines has a dimension of M×M.

9. The system of claim 7, wherein the medium further comprises instructions executable by the hardware processor to: map only the sub-matrices having non-zero entries to the matrix vector multiplication engines.

10. The system of claim 7, wherein the input vector is a dense vector.

11. The system of claim 7, wherein: the entries of the sparse matrix represent weights in a neural network; and entries of the input vector represent input data for the neural network.

12. The system of claim 7, wherein: entries of the result vector represent output of a run of a neural network, wherein the run is at least one of (i) a training run, and (ii) an inference run.

13. A method comprising:
partitioning a sparse matrix of entries into a plurality of sub-matrices, each comprising a plurality of rows corresponding to a set of rows of the sparse matrix;
mapping each of the sub-matrices to one of a plurality of respective matrix vector multiplication engines;
partitioning an input vector into a plurality of sub-vectors, each comprising a plurality of vector elements;
computing, via each matrix vector multiplication engine, a plurality of intermediate result vectors each resulting from a multiplication of one of the sub-matrices and one of the sub-vectors, the intermediate result vector corresponding to the sub-matrix's set of rows of the sparse matrix;

for each set of rows of the sparse matrix, adding element-wise the corresponding intermediate result vectors to produce a plurality of result sub-vectors; and concatenating the result sub-vectors to form a result vector, wherein each of the matrix vector multiplication engines comprises a respective memristor array.

14. The method of claim 13, wherein: each of the sub-matrices has a dimension of M×M; each of the sub-vectors has a dimension of M×1; and each of the matrix vector multiplication engines has a dimension of M×M.

15. The method of claim 13, wherein the mapping comprises: mapping only the sub-matrices having non-zero entries to the matrix vector multiplication engines.

16. The method of claim 13, wherein the input vector is a dense vector.

17. The method of claim 13, wherein: the entries of the sparse matrix represent weights in a neural network; and entries of the input vector represent input data for the neural network.

* * * * *